(12) United States Patent
Yoshimoto et al.

(10) Patent No.: US 7,656,872 B2
(45) Date of Patent: Feb. 2, 2010

(54) PACKET FORWARDING APPARATUS AND COMMUNICATION NETWORK SUITABLE FOR WIDE AREA ETHERNET SERVICE

(75) Inventors: Tetsuro Yoshimoto, Kokubunji (JP); Mariko Yamada, Tokyo (JP); Masanori Kamata, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 615 days.

(21) Appl. No.: 11/179,910

(22) Filed: Jul. 13, 2005

(65) Prior Publication Data
US 2006/0120374 A1    Jun. 8, 2006

(30) Foreign Application Priority Data
Dec. 8, 2004   (JP) ............................. 2004-354962

(51) Int. Cl.
*H04L 12/28* (2006.01)
*H04L 12/56* (2006.01)

(52) U.S. Cl. ........................................ 370/392; 370/401
(58) Field of Classification Search ........................ None
See application file for complete search history.

(56) References Cited

U.S. PATENT DOCUMENTS

| | | | |
|---|---|---|---|
| 6,449,272 B1 * | 9/2002 | Chuah et al. | 370/389 |
| 6,952,728 B1 * | 10/2005 | Alles et al. | 709/224 |
| 6,985,935 B1 * | 1/2006 | Zhang et al. | 709/219 |
| 7,325,058 B1 * | 1/2008 | Sheth et al. | 709/225 |
| 7,327,757 B2 * | 2/2008 | Ghahremani et al. | 370/466 |
| 7,388,877 B2 * | 6/2008 | Ota et al. | 370/432 |
| 7,440,414 B2 * | 10/2008 | Higashiyama | 370/401 |
| 7,461,152 B2 * | 12/2008 | Bird et al. | 370/401 |
| 2001/0048686 A1 * | 12/2001 | Takeda et al. | 370/401 |

(Continued)

FOREIGN PATENT DOCUMENTS

JP    2002-354054    5/2001

(Continued)

OTHER PUBLICATIONS

W. Townsley et al., "Layer Two Tunneling Protocol L2TP", Network Working Group, Standards Track, Aug. 1999, pp. 1-80.

(Continued)

*Primary Examiner*—Ayaz R Sheikh
*Assistant Examiner*—Timothy J Weidner
(74) *Attorney, Agent, or Firm*—Stites & Harbison PLLC; Juan Carlos A. Marquez, Esq.

(57) ABSTRACT

L2TP packet forwarding apparatus to be connected to at least two LACs (L2TP Access Concentrators) via L2TP sessions to receive packets transmitted from a gateway, which accommodates user terminals, in the form of a L2TP packet encapsulated in Bridge over PPP, has a lookup table indicating the correspondence of tunnel ID/session ID pairs to an identifier (VPN-IDs) of a wide area network to which a plurality of user terminals belong. The packet forwarding apparatus specifies an VPN-ID from the lookup table based on the tunnel ID and the session ID of a received packet and forwards, if it is confirmed that another tunnel ID/session ID pair associated with the same VPN-ID exists in the lookup table, the received packet to another L2TP session identified by the another tunnel ID/session ID pair in the form of a L2TP packet.

10 Claims, 13 Drawing Sheets

U.S. PATENT DOCUMENTS

| | | | |
|---|---|---|---|
| 2001/0050914 A1* | 12/2001 | Akahane et al. | 370/382 |
| 2002/0176414 A1* | 11/2002 | Miki et al. | 370/389 |
| 2003/0065799 A1* | 4/2003 | Kitamura | 709/230 |
| 2004/0165581 A1* | 8/2004 | Oogushi | 370/352 |
| 2004/0218611 A1* | 11/2004 | Kim | 370/401 |
| 2004/0228356 A1* | 11/2004 | Adamczyk et al. | 370/401 |
| 2005/0207411 A1* | 9/2005 | Ota et al. | 370/389 |
| 2008/0043764 A1* | 2/2008 | Ishizaki et al. | 370/401 |

OTHER PUBLICATIONS

W. Simpson, Editor, "The Point-to-Point Protocol (PPP)", Network Working Group, Standards Track, Jul. 1994, pp. 1-52.

L. Mamakos et al., "A Method for Transmitting PPP Over Ethernet (PPPoE)", Network Working Group, Standards Track, Feb. 1999, pp. 1-17.

M. Higashiyama et al., "Point-to-Point Protocol (PPP) Bridging Control Protocol (BCP)", Network Working Group, Standards Track, Apr. 2003, pp. 1-40.

* cited by examiner

FIG. 3

CONNECTION MANAGEMENT TABLE 110

| DOMAIN NAME | DESTINATION NODE |
|---|---|
| isp1. com | lns-1. access.net |
| isp2. com | lns-2. access.net |
| ether. net | lns-s. access.net |
| ⋮ | ⋮ |

USER MANAGEMENT TABLE 310

| USER NAME | PASSWORD | OTHER ATTRIBUTES | VPN-ID |
|---|---|---|---|
| user1 | **** | ~ | 1 |
| user2 | ***** | ~ | 1 |
| ⋮ | ⋮ | ⋮ | ⋮ |

VPN-ID TABLE 330

| SESSION INFORMATION (TUNNEL ID, SESSION ID) 331 | VPN-ID 332 | |
|---|---|---|
| (5, 1) | 1 | 3300-1 |
| (6, 1) | 1 | 3300-2 |
| ⋮ | ⋮ | |

FIG. 7

FORWARDING DESTINATION DETERMINATION TABLE 340

| VPN-ID 341 | SESSION INFORMATION OF FORWARDING DESTINATION (TUNNEL ID, SESSION ID) 342 | |
|---|---|---|
|  | (5, 1), (6, 1) | 3400-1 |
| ⋮ | ⋮ | |

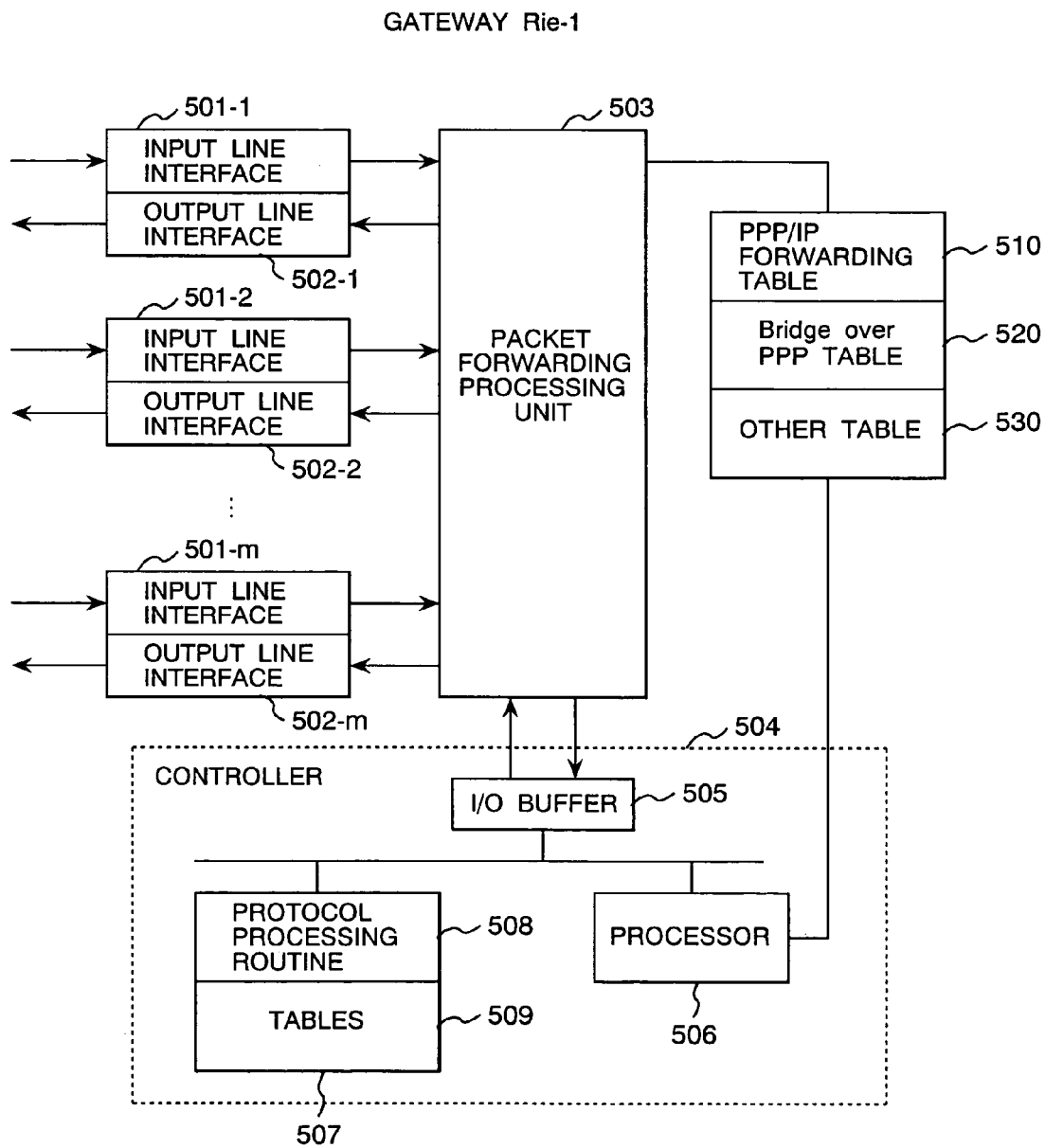

FIG. 14

Bridge over PPP TABLE 520

| IP ADDRESS | PORT NUMBER | OTHER HEADER INFORMATION | |
|---|---|---|---|
| 10.0.0.0 ~ 10.255.255.255 | — | — | 5200-1 |
| 172.16.0.0 ~ 172.31.255.255 | | | |
| 192.168.0.0 ~ 192.168.255.255 | | | |
| — | 23 | — | 5200-2 |
| ⋮ | ⋮ | ⋮ | |

PACKET FORWARDING APPARATUS AND COMMUNICATION NETWORK SUITABLE FOR WIDE AREA ETHERNET SERVICE

CLAIM OF PRIORITY

The present application claims priority from Japanese application serial No. 2004-354962, filed on Dec. 8, 2004, the content of which is hereby incorporated by reference into this application.

BACKGROUND OF THE INVENTION (1) Field of the Invention

The present invention relates to a packet forwarding apparatus and a communication network and, more particularly, to a packet forwarding apparatus and a communication network for Internet access suitable for wide area Ethernet service.

(2) Description of the Related Art

Conventionally, dedicated lines have been used to ensure layer 2 connectivity for communications between remote cites. However, since dedicated lines solely provide point-to-point connections, if the number of communication bases is great, the need for full-mesh connections between the communication bases has posed problems in network management and cost.

Recently, attention has focused on wide area Ethernet services to connect a plurality of communication bases through Ethernet and communicate Ether frames among these communication bases. Because this network scheme looks to users like as if a plurality of communication bases were directly connected via a switching hub, interconnecting the bases can be done as easily as constructing a LAN. It is advantageous in that communication cost can be reduced as compared with subscribing to a plurality of dedicated lines.

Wide area Ethernet implementation is roughly classified into three methods below:

A first method is to actually configure a huge bridge-connected Ethernet network by using switching hubs and optical interfaces. This method allows for multiplexing a plurality of connections on the network by using VLAN tags, for example, compliant with IEEE 802.1Q.

A second method is to configure a virtually bridge-connected Ethernet network on MPLS routers by applying Ethernet over Multi Protocol Label Switching (EoMPLS) technology. This method allows for multiplexing a plurality of connections on the network, using, for example, SHIM headers and VLAN tags.

A third method is to configure a virtually bridge-connected Ethernet network by setting up virtual tunnels on an IP network and connecting these tunnels to a server functioning as a virtual switching hub. This method allows for multiplexing many connections on the network by deploying many switching hubs (routers).

Communications service by the above wide area Ethernet is usually provided, oriented to middle-scale or larger corporate users. However, the wide area Ethernet is expected to be a communications service useful for home and SOHO users as well.

FIG. 2 shows an example of a typical architecture for Internet connection service that an access service provider provides to home and SOHO users. This network architecture is described, for example, in Japanese Unexamined Patent Publication No. 2002-354054 (patent document 1).

In FIG. 2, networks 1 and 2 are ISP networks belonging to different Internet Service Providers (ISPs). A network 3 is the Internet network and a network 4 is an access network formed by an IP network. The access network 4 and each of the ISP networks 1 and 2 are connected by Layer 2 Tunneling Protocol (L2TP) network servers (LNSs) 20-1 and 20-2, respectively, and LNS management servers 21-1 and 21-2 are connected to the ISP networks 1 and 2, respectively. On the access network 4, a plurality of L2TP Access Concentrators (LACs) 10 (10-1 and 10-2) and an LAC management server 11 are located. L2TP is prescribed by RFC2661 (layer Two Tunneling Protocol "L2TP").

In-home LANs L1 to L4 installed in homes are connected to the LAC 10-1 or LAC 10-2 via in-home gateways Ri-1 to Ri-4. Thus, the LACs 10-1 and 10-2 serve as ingress nodes from the gateways to the access network 4 and the LNSs 20-1 and 20-2 serve as ingress nodes from the access network 4 to the ISP networks 1 and 2.

Between the gateways Ri-1 to Ri-4 and the LACs 10 which are the ingresses to the access network, PPP sessions ip1 to ip4 are set up by PPP over Ethernet (PPPoE) prior to communication and encapsulated IP packets pass over these sessions during communication. PPP is prescribed by RFC 1661 (The Point-to-Point Protocol: PPP) and PPPoE is prescribed by RFC 2516 (A Method for Transmitting PPP over Ethernet: PPPoE). The access network 4 is normally independent of the Internet network 3 and L2TP tunnels Tn-1 to Tn-4 are formed in advance between the LACs 10 and the LNSs 20. Within the access network 4, user traffic only passes across these tunnels, and each user cannot have direct access to a communication node in the access network 4.

Upon receiving a request for connection to the Internet from a user terminal TE (TE-1, TE-2, ...) connected to a LAN, each LAC 10 communicates with the LAC management server 11 and sends a query asking for an identifier of LNS which is the egress of the L2TP tunnel corresponding to the user ID. The LAC management server 11 identifies the LNS located at the egress of that tunnel from the domain name that forms a part of the user ID and notifies the LAC of the LNS identifier. The LAC 10 sets up an L2TP session iL (iL1 to iL4) over a tunnel Tn-j toward the LNS notified from the LAC management server 11 and transits a PPP packet received from the PPPoE session between the LAC and the gateway Ri to the L2TP session over the L2TP tunnel during packet communication.

Meanwhile, when receiving the connection request from the user, the LNS 20 (20-1, 20-2) communicates with its affiliated LNS management server 21 (21-1, 21-2) in order to carry out user authentication by the LNS management server. The LNS management server 21 notifies the LNS 20 of a result of the user authentication. During packet communication, the LNS 20 decapsulates a PPP packet received over the L2TP tunnel and L2TP session and routes the IP packet extracted from the received PPP packet onto the ISP network 1 or 2. The above PPPoE session (ip1 to ip4), L2TP session (iL1 to iL4), L2TP tunnel (TE-1 to TE-4) are respectively assigned identifiers (IDs) and the LNS 20 can identify the user by the combination of a L2TP tunnel ID and a L2TP session ID.

SUMMARY OF THE INVENTION

However, the above prior art wide area Ethernet implementations have the following problems.

For instance, if the first method using switching hubs and optical interfaces is applied in an extensive communication area, the number of switching hubs to be deployed increases because of physical limitation of optical interfaces, which results in increase in the cost.

In the case of the second method using EOMPLS, all network nodes need to support a specific forwarding method by label switching. Because a label switching function is usually added to existing IP routers as a new function, the price of the IP routers with this function is higher than ordinary IP routers. To equip the communication nodes on all paths through which EoMPLS packets pass with the label switching function, a large sum of equipment investment is needed.

In the case of the third method that connects virtual tunnels set up on the IP network to a virtual switching hub server, because a service for accessing the server based on an IP address must be offered to users, there is a possibility that the server is cracked and this poses a problem in security. Furthermore, given that the provider of access service oriented to home users provides user-to-user connection services by wide area Ethernet to subscriber users, according to one of the above prior art methods, following problems would arise.

When the first method is adopted, besides the access network formed by the IP network, construction of a wide area Ethernet network is needed and it costs additionally. In particular, if the access service provider provides connection services for the Internet network in an extensive area, a very large cost is needed to provide new user-to-user connection services to existing subscriber users.

When the second method using EOMPLS is adopted, it is needed to replace all packet routers by those with the label switching function in the access network (IP network) under the access service provider. Thus, a great cost is required like a case where the first method is adopted.

When the third method using the virtual switching hub server is adopted, for example, such a network architecture would be possible that a new server is installed within the access network (IP network) 4 shown in FIG. 2 and this server terminates PPP sessions from user terminals instead of L2TP processing performed by each LAC 10, wherein a user-to-user connection is made in the IP network. However, this architecture permits a user terminal to connect to the access network, there occurs a risk that a user accesses a core network component device other than the above server and a great risk in security occurs.

It is therefore an object of the present invention to provide a communication network and a packet forwarding apparatus by which the access service provider can realize offering wide area Ethernet services to Internet access subscriber users at low cost.

It is another object of the present invention to provide a communication network and a packet forwarding apparatus allowing for offering wide area Ethernet service to subscriber users, while ensuring access network security.

To achieve the foregoing objects, a communication network of the present invention is characterized in that the access network includes a packet forwarding apparatus capable of forwarding a PPP packet received from an L2TP session to another L2TP session belonging to the same virtual wide area Ethernet as the L2TP session.

More specifically, according to the present invention, an L2TP packet forwarding apparatus to be connected with at least two LACs (L2TP Access Concentrators) via L2TP (Layer 2 Tunneling Protocol) sessions to receive packets transmitted from gateways each of which accommodates at least one user terminal, in the form of L2TP packets, comprises a lookup table including at least one entry which indicates the correspondence of tunnel ID/session ID pairs to an identifier (hereinafter referred to as VPN-ID) of a wide area network to which a plurality of user terminals belong; and a packet forwarding processing unit for specifying the VPN-ID of a received packet from the lookup table, based on the tunnel ID and session ID indicated in the L2TP header of the received packet and forwarding, if it is confirmed that another tunnel ID/session ID pair associated with the same VPN-ID exists in said lookup table, the received packet to another L2TP session specified by the another tunnel ID/session ID pair, in the form of a L2TP packet.

The L2TP packet forwarding apparatus according to the present invention further comprises a controller for acquiring, when a new L2TP session for a user is set up between the packet forwarding apparatus and one of the LACs, a VPN-ID associated with user identification information from of a user management server for managing user authentication information, and storing the correspondence of a pair of a tunnel ID and a session ID of the new L2TP session to the VPN-ID into the lookup table.

In one embodiment of the invention, the lookup table comprises a VPN-IP table for searching for a VPN-ID using a tunnel ID/session ID pair as a search key and a forwarding destination determination table for searching for tunnel ID/session ID pairs of L2TP sessions belonging to the same wide area network, using a VPN-ID as a search key, and the packet forwarding processing unit specifies a VPN-ID from said VPN-ID table based on the tunnel ID and session ID indicated in the L2TP header of the received packet and specifies said another L2TP session associated with the VPN-ID from the forwarding destination determination table.

Each of LACs accommodates a plurality of gateways each connected to an in-home LAN and communicates packets encapsulated in IP over PPP (Point to Point Protocol) or Bridge over PPP with the gateways. An Internet access network includes at least one LNS (L2TP Network Server) which is connected to each of the LACs via an L2TP (layer 2 Tunneling Protocol) session, and the LNS extracts an IP packet from an L2TP packet received from each of the LACs in the form of an IP over PPP packet and forwards the IP packet to an Internet Service Provider (ISP) network. The L2TP packet forwarding apparatus of the present invention is located within the access network independently from the LNS to communicate L2TP packets in Bridge over PPP with the LACs.

More specifically, each gateway accommodating user terminals using virtual wide area networks of the present invention requests, prior to packet communication from a user terminal, its peer LAC to set up a Bridge over PPP over PPPoE session prescribed by RFC 3518. Having received the session connection request from the gateway, the LAC specifies the L2TP packet forwarding apparatus to be a connection destination from the domain name indicated in user identification information and sets up an L2TP session in combination with the L2TP packet forwarding apparatus.

In the L2TP session setup sequence, a management server associated with the L2TP packet forwarding apparatus performs user authentication. By providing the management server with a user management table for indicating the correspondence of user information to an identifier of wide area Ethernet network (VPN-IDs), it is able to notify the L2TP packet forwarding apparatus of a VPN-ID corresponding to the L2TP session together with a result of the authentication. Upon receiving the authentication result from the management server, the L2TP packet forwarding apparatus sets up a Bridge over PPP over PPPoE session between itself and the gateway via the LAC.

A packet to be communicated over a wide area Ethernet network is encapsulated in Bridge over PPP form prescribed by RFC 3518 at each gateway and transmitted to the peer LAC via a PPPoE session. Since the LAC ignores protocols higher than PPP, it eliminates the PPPoE header from the received packet, encapsulates the PPP packet in L2TP form, and forward the L2TP packet to the L2TP packet forwarding apparatus through the L2TP session having been set up beforehand. The L2TP packet forwarding apparatus retrieves a VPN-ID based on the tunnel ID/session ID pair of the received packet, and determines whether another L2TP session associated with the VPN-ID exists. If another L2TP session associated with the same VPN-ID exists, the L2TP packet forwarding apparatus forwards the received packet to another L2TP session, whereby user-to-user connectivity on virtual Ethernet can be ensured.

According to the present invention, only by adding the L2TP packet forwarding apparatus to the Internet access network formed by an IP network and making some change in parameter setting of gateways connected to the LACs, the access service provider can provide virtual wide area Ethernet services to existing subscriber users. According to the present invention, a wide area Ethernet network for connecting many communication bases can be formed by utilizing commonly used IP network communications technology and commonly used tunneling protocols, and it is able to reduce required cost greatly as compared with the first method using switching hubs and optical interfaces and the second method using EoMPLS discussed as prior art.

BRIEF DESCRIPTION OF THE DRAWINGS

FIG. 3 shows an example of a connection management table provided in an LAC management server.

FIG. 4 shows an example of a user management table provided in a forwarding apparatus management server.

FIG. 6 shows an example of a VPN-ID table provided in a packet forwarding processing unit of the L2TP packet forwarding apparatus.

FIG. 7 shows an example of a forwarding destination determination table provided in the packet forwarding processing unit of the L2TP packet forwarding apparatus.

FIG. 12 shows an example of a gateway configuration in the second embodiment.

FIG. 14 shows an example of a Bridge over PPP table which is referred to by a packet forwarding processing unit of the gateway in the second embodiment.

DETAILED DESCRIPTION OF PREFERRED EMBODIMENTS

Figure 1:
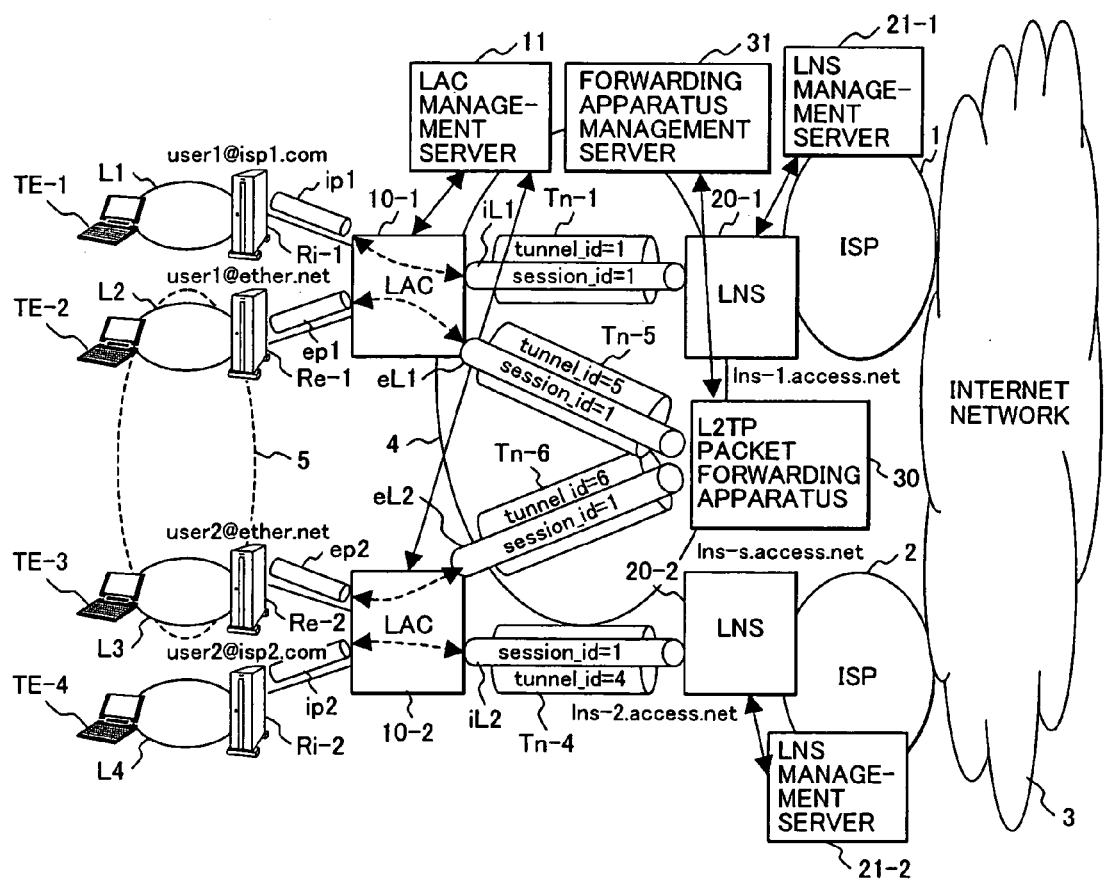
FIG. 1 is a network architecture diagram showing a first embodiment of a network to which the present invention is applied.

Some illustrative embodiments of the present invention will now be described by referring to the drawings.

First Embodiment

Figure 2:
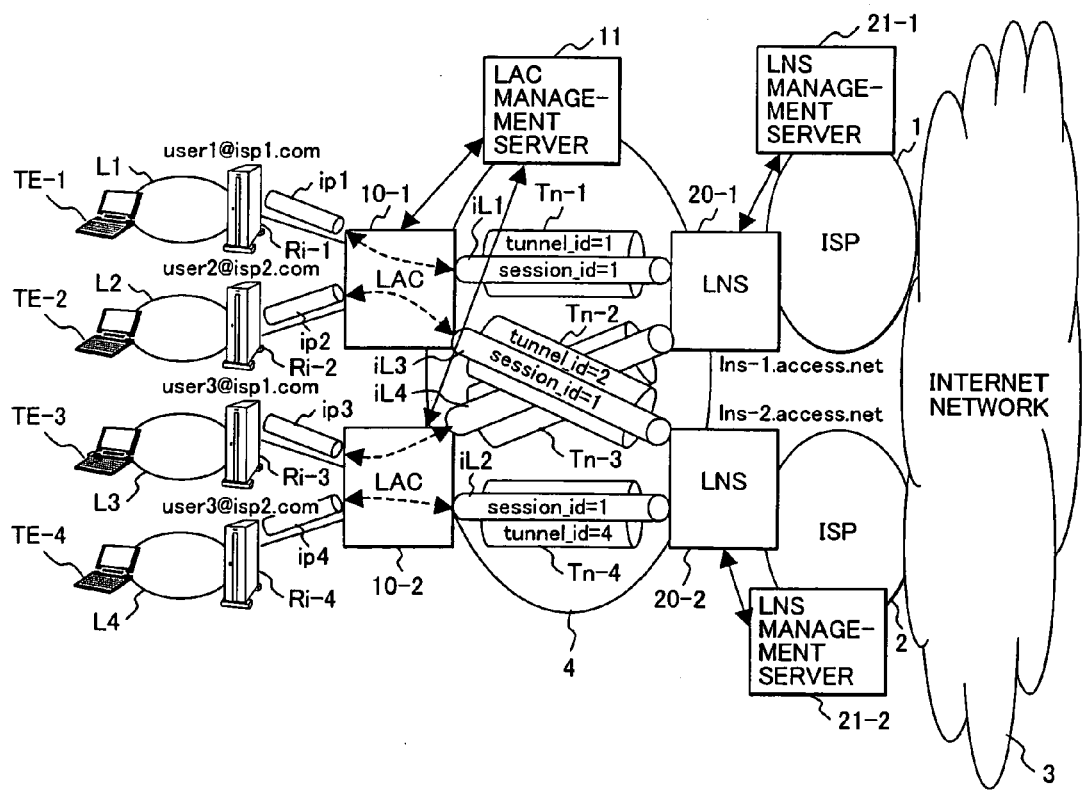
FIG. 2 is a diagram showing an example of a conventional Internet connection service network.

FIG. 1 is a network architecture diagram showing a first embodiment of a network to which the present invention is applied. Elements corresponding to those of the prior art example shown in FIG. 2 are assigned the same reference numbers or symbols in FIG. 1 and their explanation is not repeated. In L2TP, distinct values of tunnel ID and session ID can be set at each end point of a tunnel, but a tunnel ID/session ID pair shall be consistent at both ends of a tunnel here to simplify explanation. However, even if both ends of a tunnel have different values of tunnel ID and session ID, the operation principle which will be described hereinafter is unchanged.

When compared with FIG. 2, the network of FIG. 1 is distinctive in that an L2TP packet forwarding apparatus 30 which can forward L2TP packets received from an LAC to an L2TP session toward another LAC and a forwarding apparatus management server 31 provided in association with of this L2TP packet forwarding apparatus 30 are added to the access network 4.

Although L2TP tunnels Tn2 and Tn3 are omitted for simplification in FIG. 1, L2TP tunnels Tn1 to Tn4 are set up between the LACs 10-1 and 10-2, and the LNSs 20-1 and 20-2, as is the case in FIG. 2, and IP over PPP over L2TP sessions iL1 to iL4 are formed over these tunnels. Between the L2TP packet forwarding apparatus 30 and each of LACs 10-1 and 10-2, L2TP tunnels Tn5 and Tn6 are set up, respectively, and Bridge over PPP over L2TP sessions eL1 and eL2 are set up over these tunnels.

In the present embodiment, LANs L2 and L3 belong to a virtual wide area Ethernet network 5 as indicated by dotted circle. These LANs L2 and L3 are connected to the LACs 10-1 and 10-2, respectively, via in-home gateways Re-1 and Re-2 with a Bridge over PPP function instead of the in-home gateways Ri-2 and Ri-3 shown in FIG. 2. Between the gateways Re-1 and Re-2 and the LACs 10-1 and 10-2, Bridge over PPP over PPPoE sessions ep1 and ep2 are set up instead of IP over PPP over PPPoE sessions ip2 and ip3.

FIG. 3 shows an example of a connection management table 110 provided in the LAC management server 11 in the network architecture shown in FIG. 1.

The connection management table 110 includes a plurality of entries 110-1, 110-2, . . . , and each entry indicates the correspondence of a domain name 111 to a destination node 112. In this embodiment, an entry 110-3 indicating the correspondence of domain name "ether.net" for wide area Ethernet service to the host name "lns-s.access.net" of the L2TP packet forwarding apparatus 30 is newly added to the connection management table 110. Adding a new entry to the connection management table 110 can be implemented by using a general function that the LAC management server 11 has. Therefore, specific change to the functions of the LACs 10 and the LAC management server 11 is not required to carry out the present invention.

FIG. 4 shows an example of a user management table 310 provided in the forwarding apparatus management server 31.

The user management table 310 includes a plurality of entries. Each entry indicates the relation among a user name 311, a password 312 for user authentication, other attributes 313 about the user, and a virtual network identifier (VPN-ID) 314. To users belonging to a same wide area Ethernet network, the same VPN-ID 314 is assigned. Although only one wide area Ethernet network 5 is shown in FIG. 1, the L2TP packet forwarding apparatus 30 is capable to accommodate a plurality of wide area Ethernet networks with different VPN-IDs.

Figure 5:
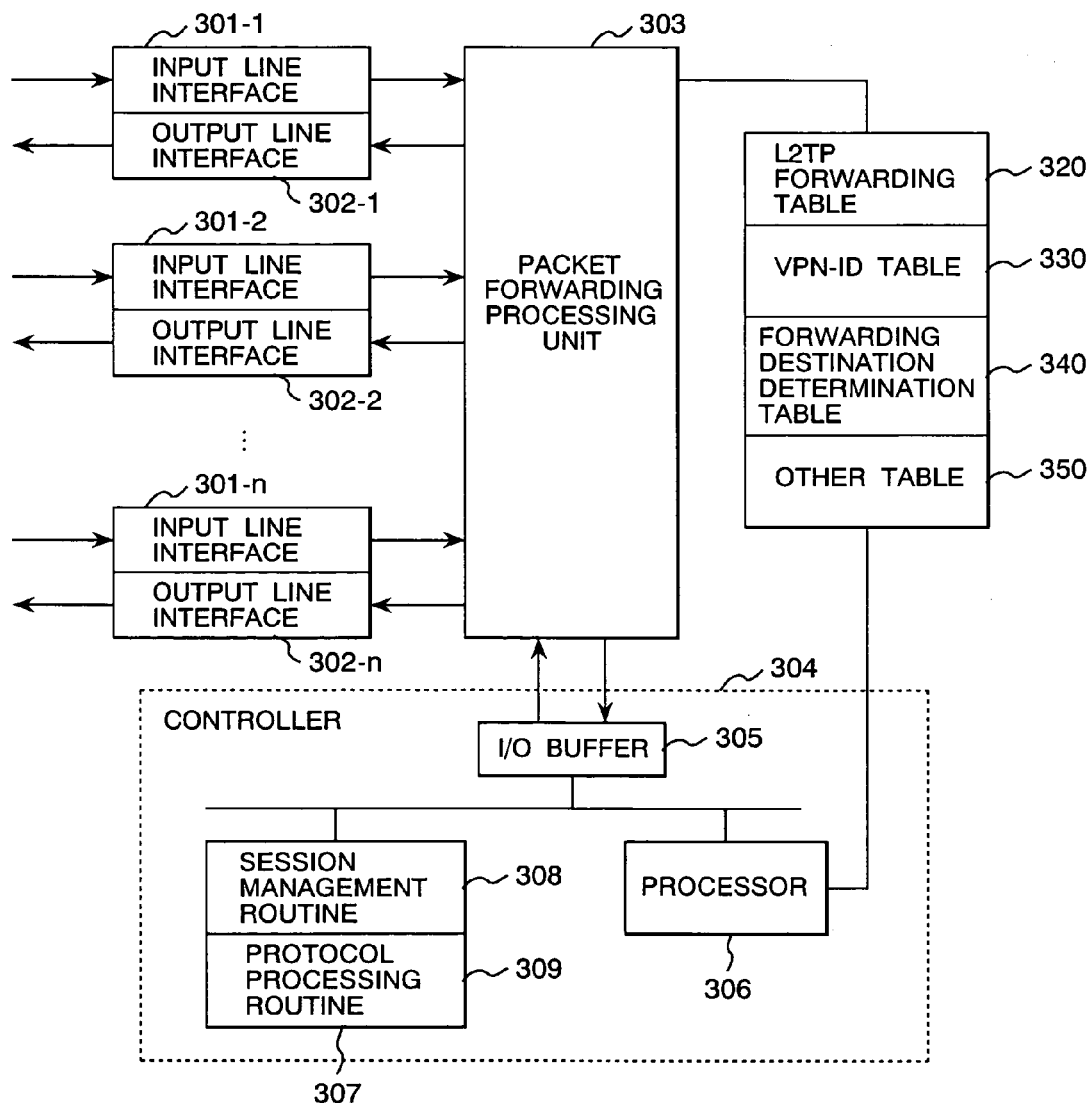
FIG. 5 is a structural diagram showing one embodiment of an L2TP packet forwarding apparatus of the present invention.

FIG. 5 is a structural diagram showing one embodiment of the L2TP packet forwarding apparatus 30.

The L2TP packet forwarding apparatus 30 is comprised of a plurality of input line interfaces 301 (301-1 to 301-*n*) and output line interfaces 302 (302-1 to 302-*n*) for connection to each LAC 10 (or a relay node in the access network 4) and the forwarding apparatus management server 31, a packet forwarding processing unit 303 connected to these interfaces, and a controller 304 connected to the packet forwarding processing unit 303.

The packet forwarding processing unit 303 has an L2TP forwarding table 320, a VPN-ID table 330, a forwarding destination determination table 340, and other tables 350. The packet forwarding processing unit 303 analyzes header information of each L2TP packet which is transmitted from one of LACs 10 and received by one of input line interfaces 301, converts the header using these tables, and selectively forwards the packet to any output line interface 302. Upon receiving a control packet from an LAC 10 or the forwarding apparatus management server 31, the packet forwarding processing unit 303 forwards the control packet to the controller 304. When receiving a control packet from the controller 304, the packet forwarding processing unit 303 selectively forwards the control packet to one of output line interfaces 302 specified in accordance with the destination address of the packet.

The controller 304 is comprised of an I/O buffer 305 for buffering control packets to be communicated with the packet forwarding processing unit 303, a processor 306, and a memory 307. In the memory 307, a session management routine 308, a protocol processing routine 309, and other various programs to be executed by the processor 306, and data necessary for the processor 306 are stored. According to a received control packet read out from the I/O buffer 305, the processor 306 updates the tables 320 to 350 to be referred to by the packet forwarding processing unit 303 and executes protocol processing for setting up a tunnel and a session. If necessary, the processor 306 is able to execute, by software, a complicated routing process that cannot be processed by the packet forwarding processing unit 303.

The packet forwarding processing unit 303 is comprised of a processor completely built with hardware logics (or a special MPU specialized for packet processing, called a network processor) to enable high-speed forwarding of a received packet and an internal bus (or a switch) for communicating packets with each of interfaces 301 and interfaces 302. The packet forwarding processing unit 303 analyzes header information of a received packet and selectively forward the received L2TP packet from an LAC to another session according to the tables 320 to 350. The packet forwarding processing unit 303 also has a function to copy a received packet and broadcasts replicas of the received packet to a plurality of LANs according to the state of the forwarding destination determination table 340 as will be described later.

The L2TP packet forwarding apparatus 30 may be built by adding the above L2TP packet forwarding functions to an existing LNS. In this case, tables necessary for the basic packet forwarding operation of the LNS that performs L2TP to IP packet conversion and IP to L2TP packet conversion are held as other tables 350.

FIG. 6 shows an example of the VPN-ID table 330.

The VPN-ID table 330 is used to search for a VPN-ID 332 based on session information (L2TP session ID/ tunnel ID pair) 331 necessary for identifying the source of a received L2TP packet. The VPN-ID 332 represents the group identifier of a wide area Ethernet to which the source of the received packet belongs. This table includes a plurality of entries 3300-1, 3300-2, for all L2TP session ID/tunnel ID pairs 331.

FIG. 7 shows an example of the forwarding destination determination table 340.

Inversely to the VPN-ID table 330, the forwarding destination determination table 340 is used to search for session information (L2TP session ID/tunnel ID pair) 342 indicating the destination of a received packet based on a VPN-ID 341. The forwarding destination determination table 340 includes one or a plurality of table entries 3400-1, . . . each having a VPN-ID 3301. In the session information field 342 of each entry, L2TP session ID/tunnel ID pairs belonging to the same wide area Ethernet group (VPN-ID) are registered one after another each time an L2TP session is set up.

Based on the L2TP session ID/tunnel ID pair of a received L2TP packet, the packet forwarding processing unit 303 first specifies the VPN-ID associated with that pair by referring to the VPN-ID table 330. After that, by searching the forwarding destination determination table 340 based on the specified VPN-ID, the packet forwarding processing unit 303 can identify the session information indicating the destination of the received packet.

Figure 8:
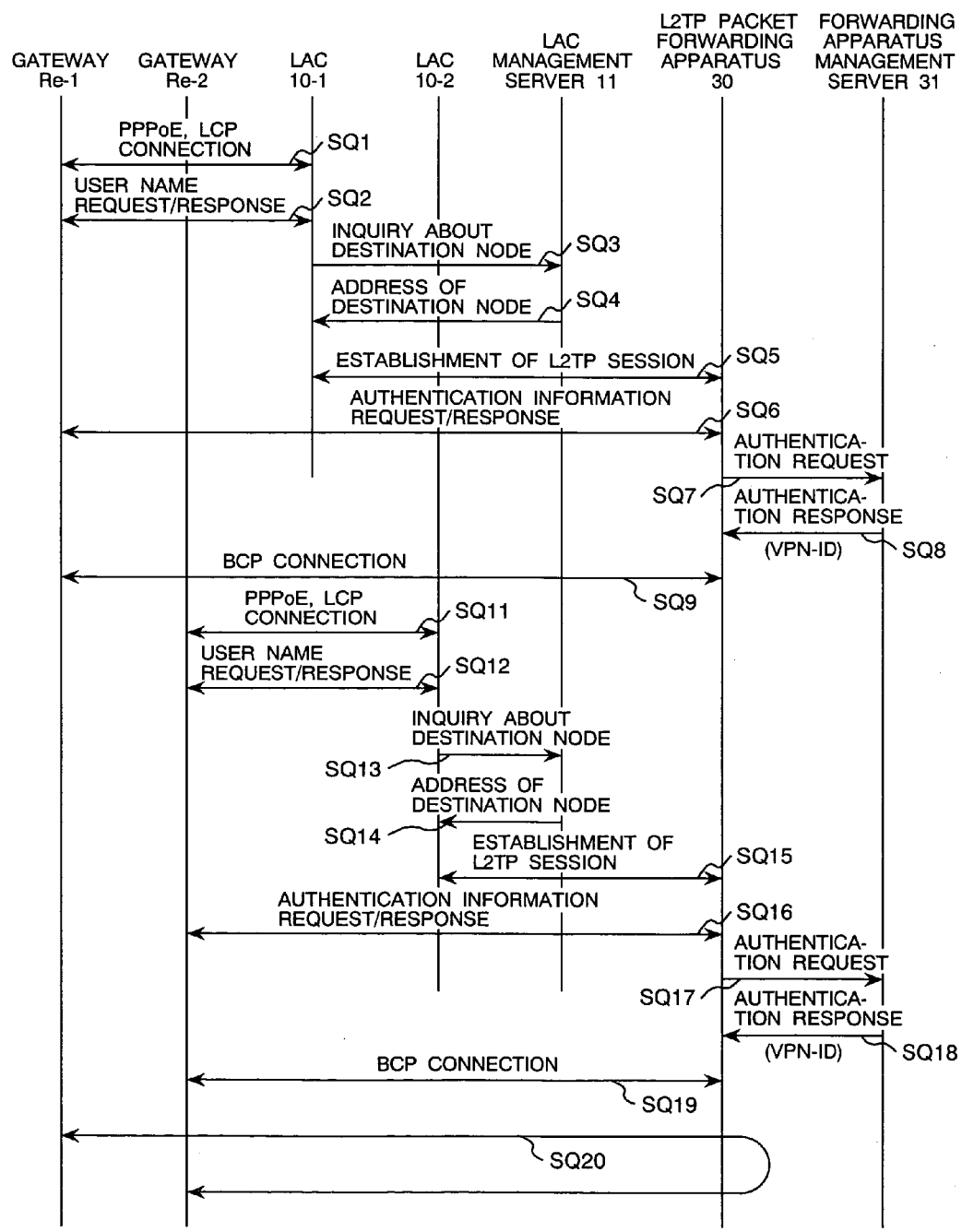
FIG. 8 is a sequence diagram for connection between in-home gateways in a virtual Wide area Ethernet shown in FIG. 1.

FIG. 8 is a sequence diagram for connection between the in-home gateways Re-1 and Re-2 in the virtual wide area Ethernet. 5 shown in FIG. 1.

Prior to transmission of packets from a user terminal TE-2, the gateway Re-1 performs procedures for PPPoE connection and PPP LCP connection in combination with the LAC 10-1 (SQ1). After a session ep1 was set up between the gateway Re-1 and the LAC 10-1 by the above connection procedures, the LAC 10-1 requests the gateway Re-1 to transmit the user name and obtains the user name "user1@ether.net" from the gateway Re-1 (SQ2).

Upon receiving the user name "user1@ether.net" from the gateway Re-1, the LAC 10-1 transmits a query asking for destination identifying information corresponding to that user name to the LAC management server 11 (SQ3). Having received the query, the LAC management server 11 extracts the domain name "ether.net" part from the user name, retrieves the address "lns-s.access.net" of the L2TP packet forwarding apparatus 30 as the destination identifying information corresponding to the above domain name from the connection management table 110, and notifies the LAC 10-1 of the destination identifying information (SQ4).

According to the destination identifying information notified from the LAC management server 11, the LAC 10-1 performs a communication procedure for setting up a new L2TP session (eL1) over an L2TP tunnel Tn5 established beforehand in combination with the L2TP packet forwarding apparatus 30 (SQ5). Upon the completion of setting up the L2TP session (eL1), the L2TP packet forwarding apparatus 30 requests the gateway Re-1 for user authentication information via the LAC 10-1 and receives the user name "user1" and password as the user authentication information from the gateway Re-1 (SQ6). Then, the L2TP packet forwarding apparatus 30 transmits an authentication request including the above authentication information to the forwarding apparatus management server 31 (SQ7).

The forwarding apparatus management server 31 searches the user management table 310 for an entry having the user name "user1" specified in the above authentication request, compares the password specified in the above authentication request with the password 312 registered in that entry, and notifies the L2TP packet forwarding apparatus 30 of a result of the user authentication (SQ8). If the user authentication is successful, the authentication result notification includes the value of VPN-ID 314 indicated in the searched entry. The authentication result notification may include other attributes 313 if necessary.

Upon receiving the authentication result notification, the L2TP packet forwarding apparatus 30 performs a procedure for Bridging Control Protocol (BCP) connection in combination with the gateway Re-1 (SQ9) and registers the relation among the identifier of L2TP tunnel Tn5, the identifier of L2TP session eL1 and the VPN-ID into the VPN-ID table 330 and the forwarding destination determination table 340. The above BCP connection enables the gateway Re-1 to forward a packet transmitted from the user terminal TE-2 to the L2TP packet forwarding apparatus 30 in the form of an Ethernet over PPP packet.

A subsequent sequence part SQ11 to SQ19 represents the sequence for BCP connection between another gateway Re-2 belonging to the virtual wide area Ethernet network 5 and the L2TP packet forwarding apparatus 30.

Prior to transmission of a packet from a user terminal TE-3, the gateway Re-2 performs procedures for PPPoE connection and PPP LCP connection in combination with the LAC 10-2 (SQ11). After setting up a session ep2 between the gateway Re-2 and the LAC 10-2, the LAC 10-2 requests the gateway Re-2 to transmit the user name and obtains the user name "user2@ether.net" from the gateway Re-2 (SQ12).

Upon receiving the user name "user2@ether.net" from the gateway Re-2, the LAC 10-2 transmits a query asking for destination identifying information corresponding to that user name to the LAC management server 11 (SQ13). Having received the query, the LAC management server 11 extracts the domain name "ether.net" part from the user name, retrieves the address "ins-s.access.net" of the L2TP packet forwarding apparatus 30 as the destination identifying information corresponding to the above domain name from the connection management table 110, and notifies the LAC 10-2 of the destination identifying information (SQ14).

According to the destination identifying information notified from the LAC management server 11, the LAC 10-2 performs a communication procedure for setting up a new L2TP session (eL2) over an L2TP tunnel Tn6 established beforehand, in combination with the L2TP packet forwarding apparatus 30 (SQ15). Upon the completion of setting up the L2TP session (eL2), the L2TP packet forwarding apparatus 30 requests the gateway Re-2 for user authentication information via the LAC 10-2 and receives the user name "user2" and password as the user authentication information from the gateway Re-2 (SQ16). Then, the L2TP packet forwarding apparatus 30 transmits an authentication request including the above authentication information to the forwarding apparatus management server 31 (SQ17).

The forwarding apparatus management server 31 searches the user management table 310 for an entry having the user name "user2" specified in the above authentication request, compares the password specified in the above authentication request with the password 312 registered in that entry, and notifies the L2TP packet forwarding apparatus 30 of a result of the user authentication (SQ18). If the user authentication is successful, the authentication result notification includes the value of VPN-ID 314 indicated in the searched entry. The authentication result notification may include other attributes 313, if necessary.

Upon receiving the authentication result notification, the L2TP packet forwarding apparatus 30 performs a procedure to set up a BCP connection in combination with the gateway Re-2 (SQ19) and registers the relation among the identifier of L2TP tunnel Tn6, the identifier of L2TP session eL2, and the VPN-ID into the VPN-ID table 330 and the forwarding destination determination table 340. This connection enables the gateway Re-2 to forward a packet transmitted from the user terminal TE-3 to the L2TP packet forwarding apparatus 30 in the form of an Ethernet over PPP packet.

Before the completion of the BCP connection between the gateway Re-2 and the L2TP packet forwarding apparatus 30, the gateway Re-1 only belongs to the virtual wide area Ethernet network 5 having VPN-ID="1" and, in the forwarding destination determination table 340, only a combination "(5, 1)" of the ID (=5) of the tunnel Tn-5 and the session ID (ID=1) is registered as session information of forwarding destination corresponding to VPN-ID="1". In this state, if the user terminal TE-2 transmits a packet, the L2TP packet forwarding apparatus 30 will discard the received packet, because another tunnel ID/session ID pair to which the received packet should be forwarded does not exist in the forwarding destination determination table 340.

Upon the completion of the BCP connection between the gateway Re-2 and the L2TP packet forwarding apparatus 30, the forwarding destination determination table 340 is updated to the state as shown in FIG. 7. That is, a new combination "(6,1)" of the ID (=6) of the tunnel Tn-6 and the session ID (ID=1) has been added as session information of forwarding destination. Therefore, the L2TP packet forwarding apparatus 30 forwards a packet received from the gateway Re-1 to the gateway Re-2 and, conversely, forwards a packet received from the gateway Re-2 to the gateway Re-1. A communication service enabling Ethernet packet communication via the L2TP packet forwarding apparatus 30 is provided to the user terminals connected to the gateways Re-1 and Re2 (SQ20).

Figure 9:
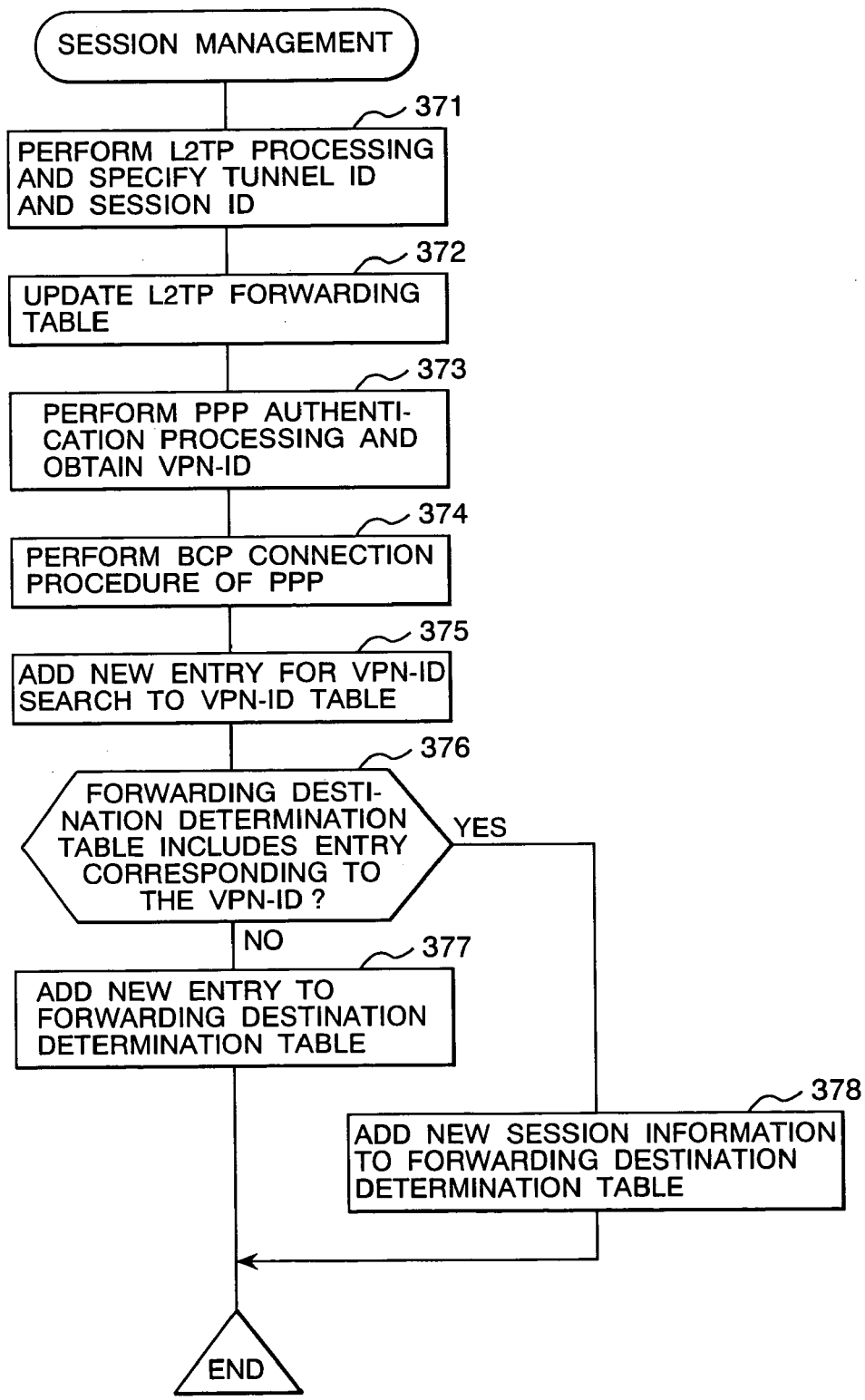
FIG. 9 is a flowchart of a session management routine to be executed by the controller of the L2TP packet forwarding apparatus.

FIG. 9 shows a flowchart of the session management routine 308 to be executed by the controller 304 of the L2TP packet forwarding apparatus 30.

Upon receiving an L2TP connection request from an LAC 10, the controller 304 performs L2TP processing (SQ5 or SQ15) by executing the protocol processing routine 309, specifies the tunnel ID and session ID corresponding to the gateway (Re-1 or Re-2) (step 371), and updates the L2TP forwarding table 320 according to the specified IDs (372). Next, the controller 304 performs PPP authentication processing on the gateway (SQ6 or SQ16) by communicating with the gateway via the LNS and communicating with the L2TP packet forwarding apparatus 30, and obtains the session attributes including VPN-ID from the forwarding apparatus management server 31 (373). Upon successful authentication of the gateway, the controller 304 performs a PPP-BCP connection procedure (SQ9 or SQ19) prescribed in RFC 3518 by executing the protocol processing routine 309 (374) and puts the gateway in a bridge over PPP transmission enabled state.

Then, the controller 304 registers a new entry for VPN-ID search into the VPN-ID table 330 (375) by applying the VPN-ID obtained from the forwarding apparatus management server 31 in step 383 and the tunnel ID and session ID specified in step 381 to the fields of the entry. The controller 304 determines whether the forwarding destination determination table 340 already includes an entry having the above VPN-ID as a search key (376).

If the object entry does not exist, the controller 304 creates a new entry for looking for the tunnel ID/session ID pair from the above VPN-ID and registers this new entry into the forwarding destination determination table 340 (377), and exits this routine. If the object entry already exists in the forwarding destination determination table 340, the controller 304 adds the above tunnel ID/session ID pair indicating a new session to which L2TP packets should be forwarded to the object entry (378), and exist this routine.

Figure 10:
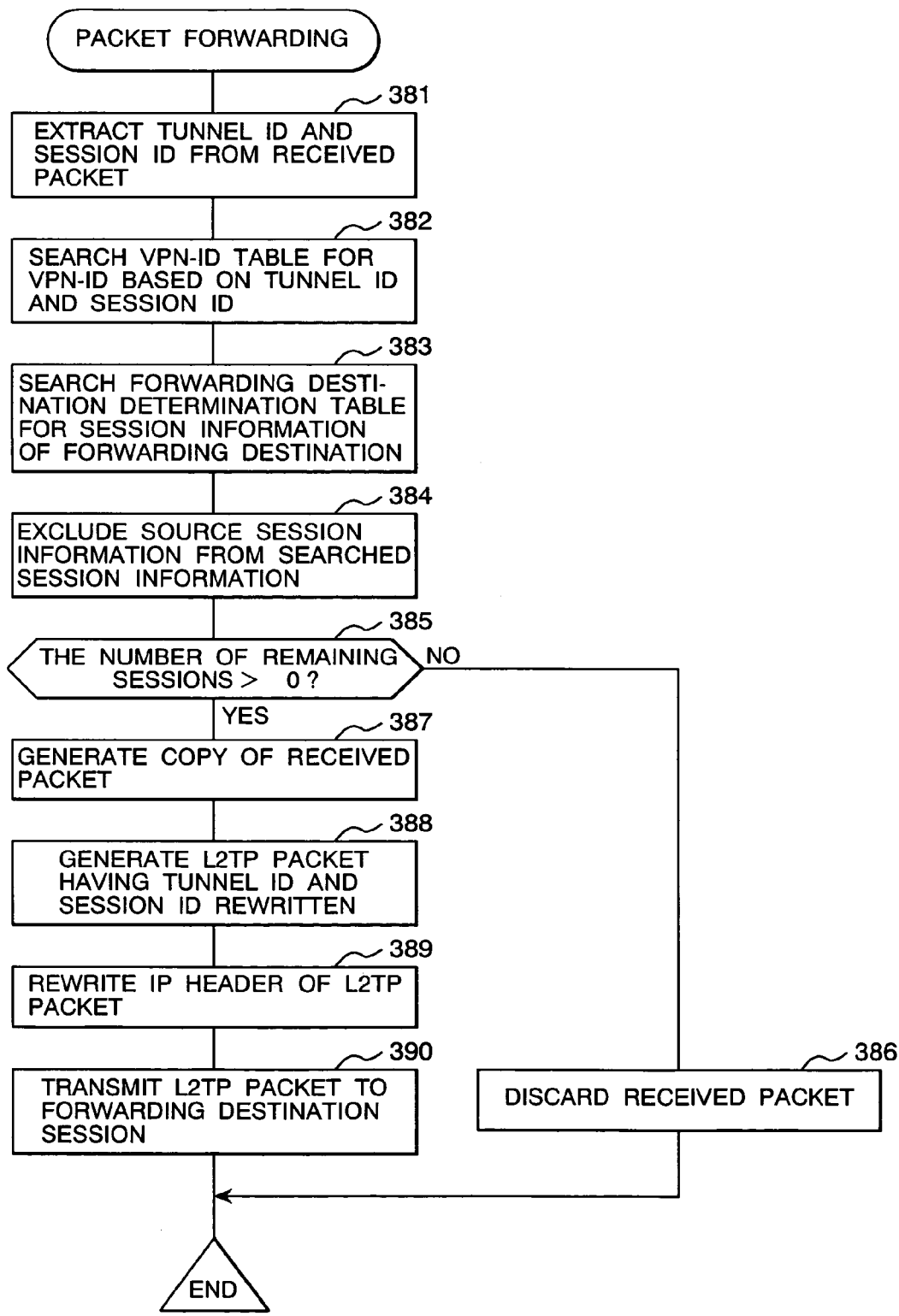
FIG. 10 shows a flowchart of packet forwarding to be performed by the packet forwarding processing unit of the L2TP packet forwarding apparatus.

FIG. 10 shows a flowchart of packet forwarding operation to be executed by the packet forwarding processing unit 303 of the L2TP packet forwarding apparatus 30.

Upon receiving a PPP packet in the form of a L2TP packet from a gateway via an LAC, the packet forwarding processing unit 303 extracts a tunnel ID and a session ID from the L2TP header of the received packet (381) and searches the VPN-ID table for VPN-ID with a search key of the extracted tunnel ID/session ID pair (382). Next, using the above VPN-ID as a search key, the packet forwarding processing unit 303 searches the forwarding destination determination table 340 for tunnel ID/session ID pairs to be the session information of forwarding destination 342 of the received packet. Because the searched session information of forwarding destination 342 includes the session information corresponding to the source of the received packet, the packet forwarding processing unit 303 excludes the tunnel ID/session ID pair extracted in step 381 from the searched session information of forwarding destination (384) and counts the number of remaining sessions (tunnel ID/session ID pairs) (385).

If the number of remaining session is zero, since it means that there is no destination to which the received packet should be forwarded, the packet forwarding processing unit 303 discards the received packet (386) and terminates the forwarding operation on this received packet. If the number of remaining sessions is not zero, the packet forwarding processing unit 303 creates as many copies of the received packet as the number of sessions remaining (387), generates L2TP packets, each including an individual tunnel ID/session ID pair selected from the remaining session information of forwarding destination (388), rewrites the IP header of each L2TP packet according to normal L2TP transport processing (389), and transmits each packet to the appropriate output line interface 302 corresponding to the session information of forwarding destination (390).

According to the above-described embodiment, by adding the L2TP packet forwarding apparatus 30 and its management server 31 to the access network 4, secure wide area Ethernet services can be realized at low cost, making good use of the L2TP framework.

Second Embodiment

Figure 11:
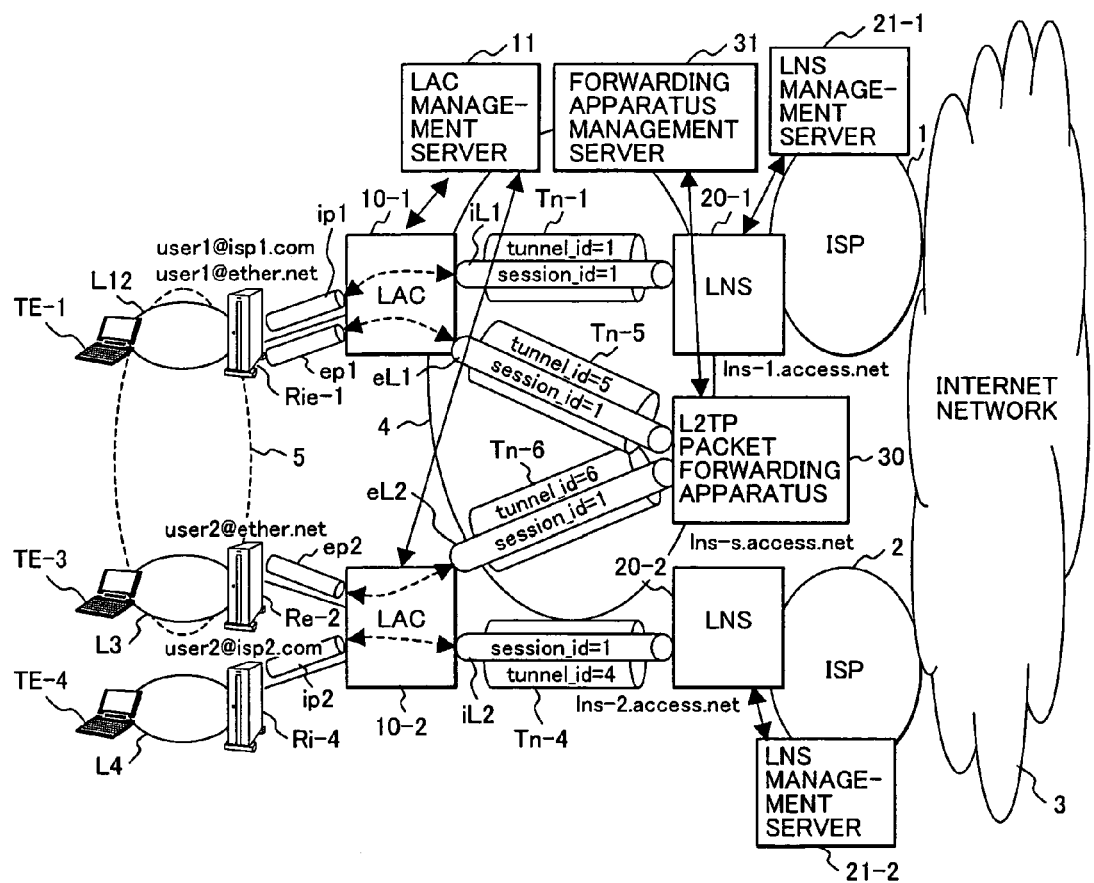
FIG. 11 is a network architecture diagram showing a second embodiment of the network to which the present invention is applied.

FIG. 11 is a network architecture diagram showing a second embodiment of the network to which the present invention is applied.

As compared with the network of the first embodiment shown in FIG. 1, a gateway Rie-1 provided with both the IP over PPP over PPPoE function and the Bridge over PPP over PPPoE function is used instead of the gateways Ri-1 and Re-1 in FIG. 1, and two LANs L1 and L2 in FIG. 1 are integrated into a single LAN L12. Between the gateway Rie-1 and the LAC 10-1, an IP over PPP over PPPoE tunnel ip1 and a Bridge over PPP over PPPoE tunnel ep1 are set up.

FIG. 12 shows an example of a configuration of the gateway Rie-1. The gateway Rie-1 is comprised of a plurality of input line interfaces 501 (501-1 to 501-*m*) and output line interfaces 502 (502-1 to 502-*m*) for connection to LANs and LACs 10, a packet forwarding processing unit 503 connected to these interfaces, and a controller 504 connected to the packet forwarding processing unit 503.

The packet forwarding processing unit 503 has a PPP/IP forwarding table 510 necessary for basic operation as the gateway for forwarding packets such as PPP and IP packets, a Bridge over PPP table 520 which will be described later, and other tables 530. The packet forwarding processing unit 503 analyzes header information of each packet from a LAN or LAC, received by one of input line interfaces 501, converts the header using these tables, and selectively forwards the received packet to one of output line interfaces 502. When receiving a control packet from an LAC 10, the packet forwarding processing unit 503 forwards the control packet to the controller 504. When receiving a control packet from the controller 504, the packet forwarding processing unit 503 selectively forwards the control packet to one of output line interfaces 502.

The controller 504 is comprised of an I/O buffer 505 for buffering control packets to be communicated with the packet forwarding processing unit 503, a processor 506, and a memory 507. In the memory 507, a protocol control program and other various programs to be executed by the processor 506 and data necessary for the processor 506 are stored. According to a received control packet read out from the I/O buffer 505, the processor 506 updates the tables 510 to 530 that are referred to by the packet forwarding processing unit 503 and performs protocol processing for setting up a tunnel and a session to the LACs. If necessary, the processor 506 implements, by software, a complicated routing process that cannot be processed by the packet forwarding processing unit 503.

The packet forwarding processing unit 503 is comprised of a processor which is completely built with hardware logics (or a special MPU specialized for packet processing, called a network processor, and a program-only memory in which software has been stored) to enable high-speed forwarding of a received packet and an internal bus (or a switch) for communicating packets with each of interfaces 501 and interfaces 502.

FIG. 13 shows the formats of a packet to be transmitted from the gateway Rie-1 to an LAC 10 in the present embodiment.

Figure 13A:
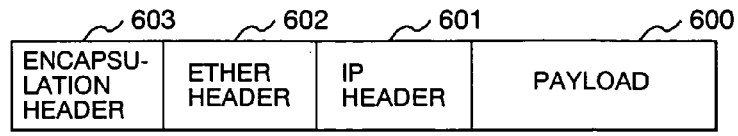
FIGS. 13A and 13B show the formats of a packet to be transmitted from the gateway.
Figure 13B:
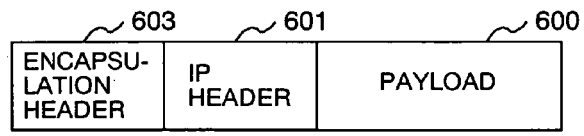

A packet that the gateway Rie-1 receives from the LAN L12 has a format in which an L2 layer Ether header 602 is added to an IP packet comprising of a payload 600 and an IP header 601. Depending on the content of header parameters of a packet received from the LAN, the gateway Rie-1 forwards the packet to the LAC 10 in different manners. That is, according to predefined header requirements, the gateway Rie-1 adds, in a first case, an encapsulation header 603 to the header part including the Ether header 602, as shown in FIG. 13A, and transmits the packet to the LAC 10. In a second case, the gateway Rie-1 adds the encapsulation header 603 to the IP packet after eliminating the Ether header 602, as shown in FIG. 13B, and transmits the packet to the LAC 10.

FIG. 14 shows an example of the Bridge over PPP table 520 to be referred to by the packet forwarding processing unit 503.

The Bridge over PPP table 520 includes a plurality of entries each defining header requirement to be satisfied by a packet that is forwarded to an LAC through Bridge over PPP processing. Header requirement is designated by the values of IP address 521, TCP/UDP port number 522, and other header information 523. In the table 520, the header requirement is defined, for example, like an entry 5200-1, by the range of a private address specified in the field of an IP address 521. The header requirement may be defined, like an entry 5200-2, by the type of application (port 23 "telnet2") specified in the field of port number 522 without regard to IP address. The header requirement of a packet to be subjected to Bridge over PPP processing can be specified by any IP header item. If necessary, an Ethernet header information items may be used as the header requirement in addition to the IP header parameters.

Figure 15:
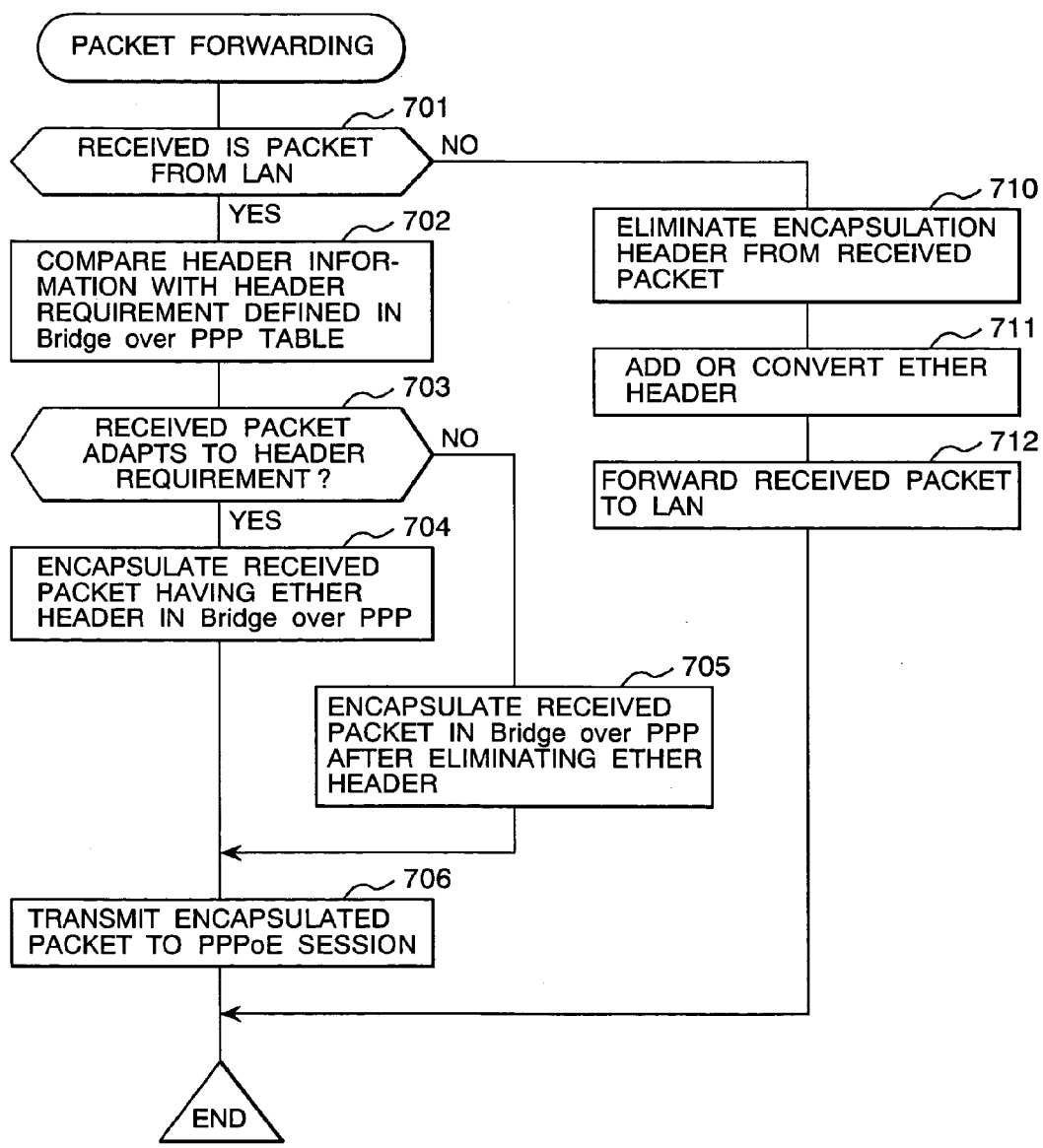
FIG. 15 is a flowchart of packet forwarding to be performed by the packet forwarding processing unit.

FIG. 15 shows a flowchart of packet forwarding to be performed by the packet forwarding processing unit 503 of the gateway Rie-1.

The packet forwarding processing unit 503 determines whether a packet received from one of input line interfaces 501 (501-1 to 501-*m*) is the one received from LAN (step 701). If it is the packet received from LAN and to be forwarded to LAC, the packet forwarding processing unit 503 scans the header portion including the Ether header 601 and compares the header information with the header requirements defined in the Bridge over PPP table 520 (702). As a result of the comparison (703) if the received packet header information adapts to any header requirement defined in the Bridge over PPP table 520, the packet forwarding processing unit 503 encapsulates the received packet having the Ether header 602 in Bridge over PPP (704) and transmits the packet (706) in the format shown in FIG. 13A to the output line interface 502 corresponding to the PPPoE session (tunnel ep1 toward LAC). If the received packet header information does not match with any header requirement in the Bridge over PPP table 520, the packet forwarding processing unit 503 encapsulates the received packet in IP over PPP after eliminating the Ether header 602 (705), and transmits the packet (706) in the format shown in FIG. 13B to the output line interface 502 corresponding to the PPPoE session (tunnel ip1 toward LAC).

If the received packet is the one received from LAC and to be forwarded to LAN, the packet forwarding processing unit 503 eliminates the encapsulation header from the received packet (710), adds an Ether header or converts the header (711), and forwards the packet to the output line interface 502 toward LAN.

According to this embodiment, by setting up a PPPoE session ip1 corresponding to a user ID for Internet connection and a PPPoE session ep1 corresponding to a user ID for Wide area Ethernet service between the gateway Rie-1 and LAC, and by selecting one of sessions to which a PPP packet should be outputted in accordance with the header information of the received packet, the gateway Rie-1. can provide both the Internet connection service and the wide area Ethernet service to the same user concurrently.

Third Embodiment

Figure 16:
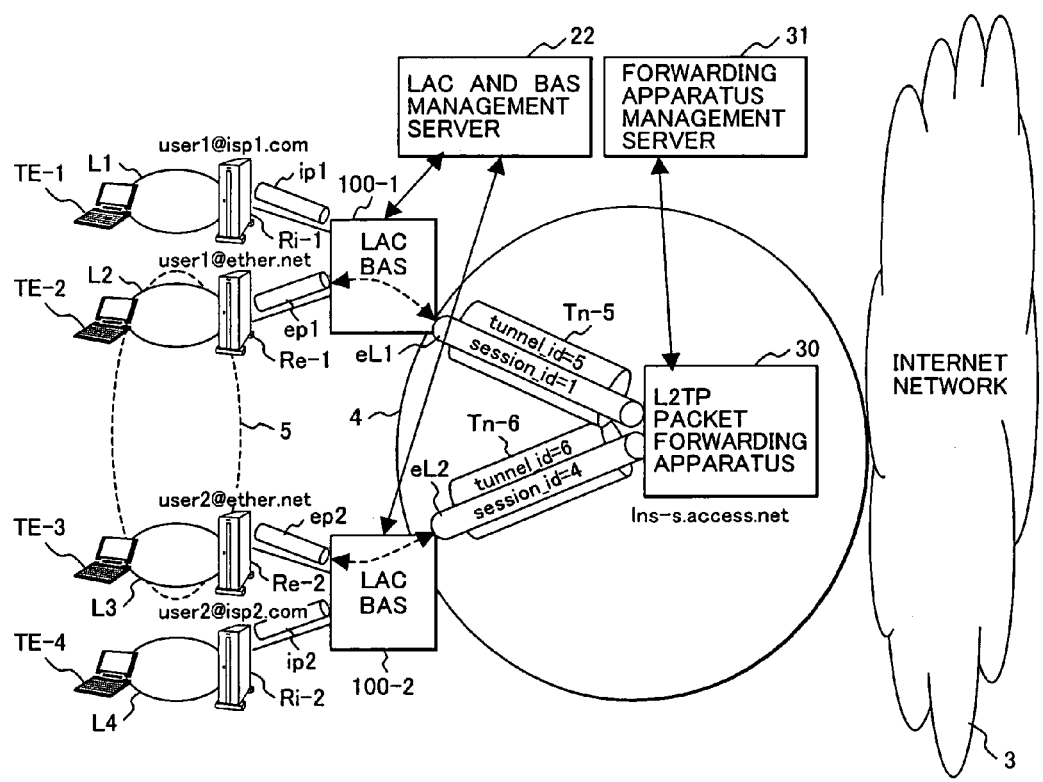
FIG. 16 is a network architecture diagram showing a third embodiment of the network to which the present invention is applied.

FIG. 16 is a network architecture diagram showing a third embodiment of the network to which the present invention is applied.

While such a network architecture that the access network 4 and ISP networks 1 and 2 exist independently has been discussed in the first and second embodiments, the present invention is also applicable to a network architecture in which the access network 4 and ISP networks 1 and 2 are integrated.

In the case where the access network 4 and ISP networks 1 and 2 are integrated, the LNSs for connecting the access network and ISP networks are dispensed with, as shown in FIG. 16, and the access network 4 becomes an IP network having the same address space as the Internet 3. Wide area Ethernet service is implemented by the L2TP packet forwarding apparatus 30 as same as the first embodiment.

In the third embodiment, LAC-BASs 100-1 and 100-2 having the LAC function and Broadband Access Server (BAS) function are used instead of the LACs 10-1 and 10-2. To the LAC-BASs 100-1 and 100-2, an LAC-BAS management server 22 having both the function of the LAC management server 11 and the function of the LNS management server 21 is connected.

In this embodiment, in the same way as the first embodiment, the gateway Ri-1 (Ri-2) and the gateway Re-1 (Re-2) establish PPP sessions ip1 (ip2) and ep1 (ep2) with the LAC-BAS 100-1 (100-2), respectively. The LAC-BAS 100-1 (100-2) makes query to the management server 22, and terminates an IP over PPP session ip1 (ip2). A Bridge over PPP session ep1 (ep2) is connected to the L2TP packet forwarding apparatus 30 by through L2TP session eL1 (eL2).

Upon receiving a packet encapsulated by IP over PPP from a gateway Ri-1 (Ri-2), the LAC-BAS 100-1 (100-2) eliminates the encapsulation header from the received packet and forwards the IP packet to the Internet 3 via the IP network 4 by normal IP routing (BAS function). Meanwhile, when a packet encapsulated in Bridge over PPP is received from a gateway Ri-1 (Ri-2), the LAC-BAS 100-1 (100-2) forwards the received packet to a Bridge over PPP session ep1 (ep2) using L2TP (LAC function). Therefore, this received packet is forwarded to another LAN belonging to the same Wide area Ethernet network, to which the source of the packet belongs, by the L2TP packet forwarding apparatus 30, similarly to the case in the first embodiment.

Because the third embodiment is arranged such that packets for Internet access transmitted from user terminals pass across the IP network without tunneling through the access network, security seems to be lower than the first and second embodiments. However, the IP address of the L2TP packet forwarding apparatus 30 is notified to only the LAC-BASs 100-1 and 100-2 and is not disclosed to user terminals. Thus, in practical application, this embodiment can guarantee higher security than a server-type wide area Ethernet network system to access network providers.

What is claimed is:

1. A Layer 2 Tunneling Protocol (L2TP) packet forwarding apparatus to be connected with at least two L2TP Access Concentrators (LACs) via L2TP sessions to receive Point to Point Protocol (PPP) packets each transmitted from one of gateways and forwarded by one of said LACs in the form of an L2TP packet, each of said gateways being connected to one of said LACs and accommodating at least one Local Area network (LAN) belonging to a virtual wide area network, the packet forwarding apparatus comprising:

a lookup table including at least one entry which indicates the correspondence of a tunnel ID/session ID pair of an L2TP session to a Virtual Private Network identifier (VPN-ID) corresponding to said virtual wide area network to which a plurality of user terminals are connected through said LANs; and a packet forwarding processing unit which specifies the VPN-ID of a received PPP packet from said lookup table, based on the tunnel ID and the session ID indicated in an L2TP header added to the received PPP packet and which rewrites, if another tunnel ID/session ID pair associated with the same VPN-ID exists in said lookup table, the tunnel ID and the session ID of the L2TP header to said another tunnel ID/session ID pair and forwards the received PPP packet to another LAN of said virtual wide area network through another L2TP session between the L2TP packet forwarding apparatus and one of said LACs, which is specified by said another tunnel ID/session ID pair, in the form of an L2TP packet including said another tunnel ID/session ID pair in its L2TP header.

2. The L2TP packet forwarding apparatus according to claim 1, further comprising:

a controller which acquires, when a new L2TP session for a user is set up between the L2TP packet forwarding apparatus and one of said LACs, a VPN-ID corresponding to identification information of the user from a user management server for managing user authentication information, and which stores the correspondence of a pair of a tunnel ID and a session ID of the new L2TP session to the VPN-ID into said lookup table.

3. The L2TP packet forwarding apparatus according to claim 1, wherein said lookup table comprises a VPN-ID table storing a VPN-ID in association with a tunnel ID/session ID pair to be used as a search key and a forwarding destination determination table storing tunnel ID/session ID pairs of L2TP sessions belonging to the same virtual wide area network in association with a VPN-ID to be used as a search key, and said packet forwarding processing unit specifies a VPN-ID from said VPN-ID table based on the tunnel ID and the session ID indicated in the L2TP header of the received PPP packet and specifies said another L2TP session corresponding to the VPN-ID from said forwarding destination determination table.

4. The L2TP packet forwarding apparatus according to claim 1, wherein said packet forwarding processing unit receives said PPP packet from each of said LACs in the form of a Bridge over PPP packet encapsulated in the L2TP packet.

5. A communication network comprising:

a plurality of Layer 2 Tunneling Protocol (L2TP) Access Concentrators (LACs) each accommodating a plurality of gateways connected to in-home LANs and communicating packets in the form of an IP over PPP (Point to Point Protocol) packet or a Bridge over PPP packet with said gateways;

at least one L2TP Network Server (LNS), which is connected to each of said LACs via an L2TP session, and which extracts an IP packet from an IP over PPP packet received from each of said LACs in the form of L2TP packet to forward the IP packet to an Internet Service Provider (ISP) network; and an L2TP packet forwarding apparatus connected to said LACs via L2TP sessions, wherein each of said LACs forwards each of IP over PPP packets received from said gateways to said LNS in the form of an L2TP packet and forwards each of Bridge over PPP packets received in from said gateways to said L2TP packet forwarding apparatus in the form of an L2TP packets, and said L2TP packet forwarding apparatus comprising:

a lookup table including at least one entry indicating the correspondence of a tunnel ID/session ID pair of an L2TP session to a Virtual Private Network identifier (VPN-ID) corresponding to a virtual wide area network to which a plurality of user terminals are connected through said in-home LANs; and a packet forwarding processing unit which specifies from said lookup table the VPN-ID of a Bridge over PPP packet received from one of said LACs, based on the tunnel ID and the session ID indicated in an L2TP header added to the received Bridge over PPP packet and which rewrites, if another tunnel ID/session ID pair associated with the same VPN-ID exists in said lookup table, the tunnel ID and the session ID of the L2TP header to said another tunnel ID/session ID pair and forwards the received Bridge over PPP packet to another LAN of said virtual wide area network through another L2TP session between the L2TP packet forwarding apparatus and one of said LACs, which is specified by said another tunnel ID/session ID pair, in the form of an L2TP packet including said another tunnel ID/session ID pair in its L2TP header.

6. The communication network according to claim 5, further comprising:

a forwarding apparatus management server for user authentication, associated with said L2TP packet forwarding apparatus, said L2TP packet forwarding apparatus further comprising a controller for acquiring, when a new L2TP session for a user is set up between the L2TP packet forwarding apparatus and one of said LACs, a VPN-ID corresponding to user identification information of the user from said forwarding apparatus management server and storing the correspondence of a pair of a tunnel ID and a session ID of the new L2TP session to the VPN-ID into said lookup table.

7. The communication network according to claim 6, further comprising:

an LAC management server for storing relations between domain names to be extracted from the user identification information and destination node identifiers; and an LNS management server for user authentication, associated with said LNS, wherein, each of said LACs acquires, when a new session connection request is received from one of said gateways, a destination node identifier corresponding to user identification information indicated in the session connection request from said LAC management server and sets up an L2TP session between the LAC and said LNS or said L2TP packet forwarding apparatus in accordance with the destination node identifier, and the LNS or the L2TP packet forwarding apparatus with which the session has been set up requests said LNS management server for user authentication.

8. The communication network according to claim 5, wherein said lookup table comprises a VPN-ID table storing a VPN-ID in association with a tunnel ID/session ID pair to be used as a search key and a forwarding destination determination table storing tunnel ID/session ID pairs belonging to the same virtual wide area network in association with a VPN-ID to be used as a search key, and the packet forwarding processing unit of said L2TP packet forwarding apparatus specifies a VPN-ID from said VPN-ID table based on the tunnel ID and the session ID indicated in the L2TP header of the received Bridge over PPP packet and specifies said another L2TP session corresponding to the specified VPN-ID from said further destination determination table.

9. The communication network according to claim 5, wherein at least one of said gateways is provided with a table for defining header requirements of packets to be forwarded to said L2TP packet forwarding apparatus, transmits a packet received from one of said in-home LANs to one of said LACs after converting the packet together with an L2 layer header into the Bridge over PPP if header information of the received packet matches with any of said header requirements, and transmits a packet received from one of said in-home LANs to one of said LACs after eliminating the L2 layer header and converting the packet into the IP over PPP packet if the header information of the received packet does not match with any of said header requirements.

10. The communication network according to claim 5, wherein each of said gateways transmits a packet to be routed to another LAN of said virtual wide area network via said L2TP packet forwarding apparatus in the form of a Bridge over PPP over PPPoE (PPP over Ethernet) packet.

* * * * *

UNITED STATES PATENT AND TRADEMARK OFFICE
CERTIFICATE OF CORRECTION

PATENT NO. : 7,656,872 B2 Page 1 of 1
APPLICATION NO. : 11/179910
DATED : February 2, 2010
INVENTOR(S) : Yoshimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,656,872 B2 | Page 1 of 1 |
| APPLICATION NO. | : 11/179910 | |
| DATED | : February 2, 2010 | |
| INVENTOR(S) | : Yoshimoto et al. | |

It is certified that error appears in the above-identified patent and that said Letters Patent is hereby corrected as shown below:

On the Title Page, Under Item (73) please delete:

"Hitachi Communication Technologies, Ltd."

and insert:

--Hitachi, Ltd.--

Signed and Sealed this
Thirty-first Day of December, 2013

Margaret A. Focarino
*Commissioner for Patents of the United States Patent and Trademark Office*